March 14, 1967   A. O'CONNOR FENTON   3,308,543
FOLDABLE MEASURING RULES
Filed Dec. 2, 1964
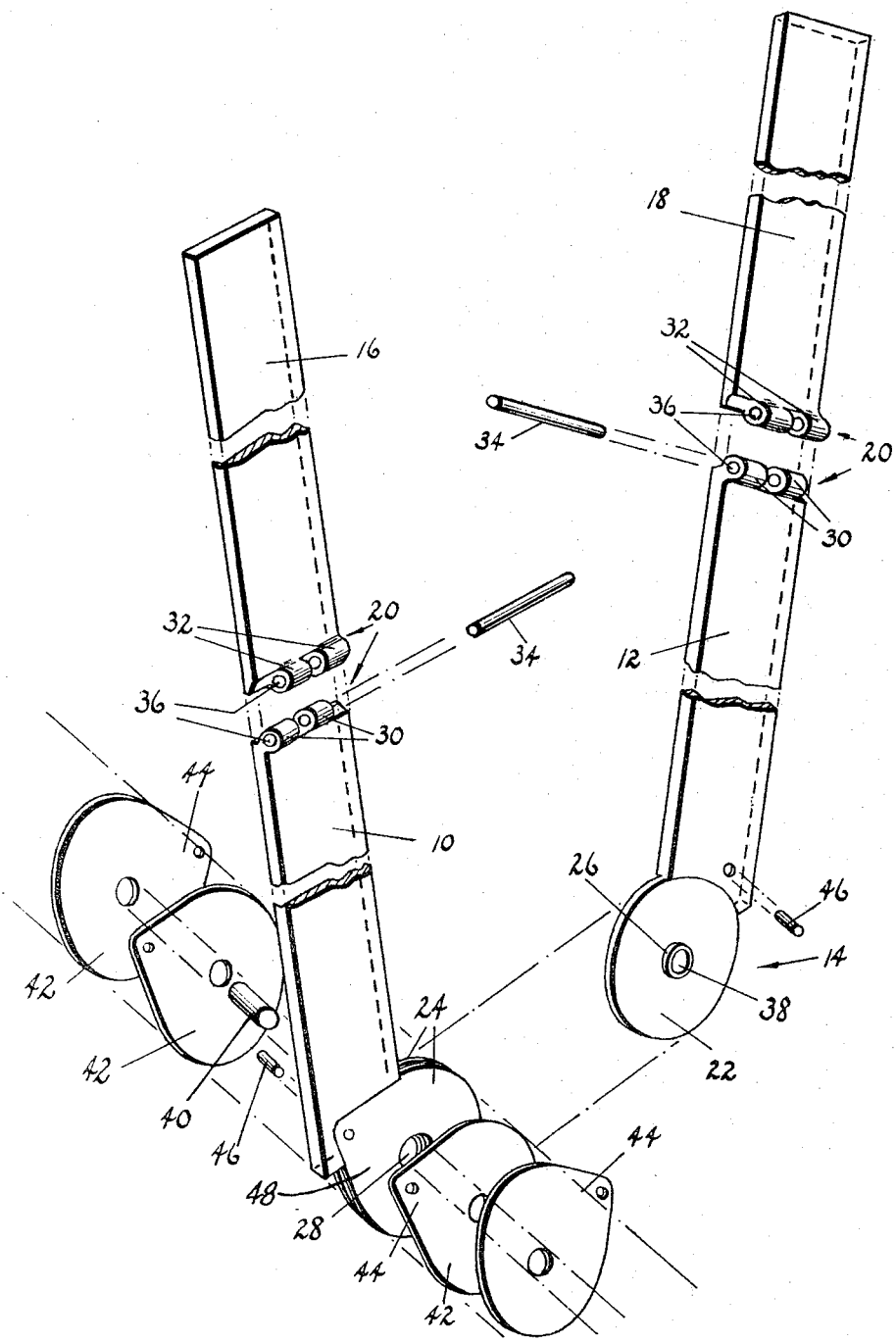
ALAN O'CONNOR FENTON
INVENTOR
BY
ATTORNEYS

3,308,543
FOLDABLE MEASURING RULES
Alan O'Connor Fenton, Gamston, near Retford, England, assignor to William Marples & Sons Limited, Sheffield, England
Filed Dec. 2, 1964, Ser. No. 415,358
Claims priority, application Great Britain, Dec. 10, 1963, 48,723/63
2 Claims. (Cl. 33—105)

The invention relates to foldable measuring rules and has for its object to provide an improvement therein.

Heretofore, foldable measuring rules have generally been made principally of hard wood with the graduations of the rule inscribed on the surface of the wood, and the hinge-joint and the knuckle-joints connecting adjoining foldable lengths of the rule have generally been made of metal and are riveted to said lengths. The present invention provides a construction of foldable measuring rule which is much cheaper to produce than hitherto.

According to the invention, a foldable measuring rule includes two measuring elements connected together by means of a hinge-joint, said elements being made of a synthetic plastic material and leaves of the hinge-joint which are carried by said elements being moulded integrally therewith. Preferably, a pivot pin by means of which the leaves of the hinge-joint are pivotally connected is moulded integrally with one of the leaves, which is itself moulded integrally with one of the measuring elements and which when the rule is assembled is sandwiched between two remaining leaves which are moulded integrally side-by-side with the other of the measuring elements. Two pairs of washers preferably overlie the leaves of the hinge-joint and are secured thereon by means of a rivet extending axially through the pivot pin. The graduations of the rule are preferably formed on the measuring elements during the moulding thereof. The two measuring elements, besides being pivotally connected together, are preferably connected respectively to further measuring elements and pivoted thereto by means of knuckle-joints, the axes of which are at right angles to the axis of the hinge-joint connecting the two first mentioned measuring elements. Interlocking elements of the knuckle-joints are preferably moulded integrally with respective measuring elements.

In order that the invention may be fully understood and readily carried into effect, a preferred embodiment thereof will now be described, by way of example only, with reference to the accompanying drawing which is an exploded view of a foldable measuring rule embodying the invention.

Referring now to the drawing, a folding measuring rule is composed of four measuring elements pivotally connected together, two elements 10 and 12 connected together by means of the hinge-joint 14 and two further elements 16 and 18 connected to the ends of the elements 10 and 12 remote from the hinge-joint by means of knuckle-joints 20.

The elements of the measuring rule are each moulded in a synthetic plastic material, and the graduations of the rule are formed on the measuring elements during the moulding thereof or are impressed or engraved thereon after the elements have been moulded. In addition, the pivotally connectible end portions of the elements are moulded integrally therewith. Thus, one of the leaves, a leaf 22, of the hinge-joint 14 is carried by and moulded integrally with the element 12, and a pair of leaves 24 of said hinge-joint are carried by and moulded integrally side-by-side with the element 10. Additionally, a pivot pin 26, by means of which the leaves of the hinge-joint are pivotally connected together, is moulded integrally with the leaf 22, projecting an equal distance from opposite faces of said leaf, and aligned holes 28 are moulded in the leaves 24 for the reception of said pivot pin.

To assemble the leaves of the hinge-joint together, it is merely necessary to spring the leaves 24 slightly apart to allow the pivot pin 26 to be passed between them; to bring the ends of said pin between the leaves 24 and into register with the holes 28 therein; and to allow the leaves 24 to spring together again into engagement with the faces of the leaf 22.

A hole 38 is formed in the pivot pin 26 for the reception of a rivet 40 at the axis of the joint when the leaves of the hinge-joint have been assembled together, and pairs of washers 42 are secured on opposite ends of said rivet which are then deformed to prevent subsequent accidental springing apart of the leaves 24. As can be seen in the drawing, the washers 42 are each provided with an integral lug portion 44 by means of which they can be riveted, by rivets 46, to respective measuring elements, so that in effect they form additional leaves of the hinge-joint. The lug portions of the innermost washers are accommodated in shallow depressions 48 which are moulded into the element 10.

The interlocking elements of the knuckle-joints 20 are moulded integrally with respective measuring elements. Thus, the elements 10 and 12 each have two elements 30 of respective knuckle-joints moulded integrally at their ends remote from their hinge-jointed ends, and the elements 16 and 18 each have one end at which two elements 32 are integrally moulded. Pivot pins 34 are provided for insection through holes 36 in the elements 30 and 32 of the respective knuckle-joints.

Thus there is provided a foldable measuring rule which by virtue of its simplicity of construction is very cheap to produce. Furthermore, if the synthetic plastic material of which the rule is made is sufficiently resilient (that is, somewhat more resilient than is necessary to allow the leaves 24 to be sprung apart during assembly) the rule can be virtually unbreakable. However, the possibility exists that the material may be a rigid setting synthetic plastic, assembly of the elements 10 and 12 being carried out whilst the leaves 24 are still sufficiently plastic.

Various modifications may be made without departing from the scope of the invention. For example, the washers 42 need not be provided with integral lug portions riveted to one of the adjacent measuring elements. Indeed, said washers could be entirely omitted if desired. Alternatively, it may be found that a single pair of washers, that is one washer disposed at each side of the hinge-joint, is sufficient to stiffen the joint, and said washers may or may not be provided with integral lug portions as desired. It will also be understood that the invention is not limited in its scope to a rule having four measuring elements.

What I claim is:

1. In a foldable measuring rule, the combination of a first measuring element, a single leaf of a hinge joint formed integrally with said first measuring element, a second measuring element, a pair of leaves of said hinge joint formed integrally with said second measuring element and spaced side by side for the reception of said single leaf therebetween, and a pivot pin formed integrally with said single leaf and projecting an equal distance from opposite faces thereof for reception in aligned holes in said pair of leaves, said pivot pin having a hollow cylindrical form and said projection distance equalling the thickness of said leaves on said second measuring element to mate with said holes therein to form an accurately positioned pivot by insertion of said single leaf within said pair of leaves, a first pair of washers positioned astraddle said hinge joint, each of said washers overlying one of said pair of leaves of said hinge joint, each washer of said first pair of washers being provided with an integral lug portion secured to said second measuring element, a second pair of washers positioned astraddle said joint, each of said washers overlying a respective washer of said first pair of washers, each of said washers being provided with an integral lug portion secured to said first measuring element, said first and said second pair of washers being provided with axially positioned holes corresponding to the axis of said hollow pivot pin, and a rivet extending through said hollow pin to secure said first and second pairs of washers at the axis of said hinge joint.

2. A foldable measuring rule according to claim 1 which includes an additional measuring element hingedly coupled to each of said first and second measuring elements, said hinged couplings comprising knuckle joints, the axes of the knuckle joints being at right angles to the axis of the hinge joint which connects said first and second measuring elements.

References Cited by the Examiner

UNITED STATES PATENTS

| | | | |
|---|---|---|---|
| 792,387 | 6/1905 | Baker | 33—118 |
| 841,627 | 1/1907 | Cloud | 33—118 |
| 1,210,370 | 12/1916 | Dvorak | 33—118 X |
| 1,652,980 | 12/1927 | Glass | 33—115 |
| 2,735,185 | 2/1956 | Naphtal | 33—120 |

FOREIGN PATENTS

| | | |
|---|---|---|
| 880,215 | 6/1953 | Germany. |
| 15,666 | 1903 | Great Britain. |

LEONARD FORMAN, *Primary Examiner.*

H. N. HAROIAN, *Assistant Examiner.*